(12) United States Patent
Pons et al.

(10) Patent No.: US 11,988,112 B2
(45) Date of Patent: May 21, 2024

(54) RECOVERED-CYCLE AIRCRAFT TURBOMACHINE

(71) Applicant: SAFRAN HELICOPTER ENGINES, Bordes (FR)

(72) Inventors: Bernard Claude Pons, Moissy-Cramayel (FR); Alphonse Puerto, Moissy-Cramayel (FR); Laurent Pierre Tarnowski, Moissy-Cramayel (FR); Loïs Pierre Denis Vive, Moissy-Cramayel (FR)

(73) Assignee: Safran Helicopter Engines, Bordes (FR)

( * ) Notice: Subject to any disclaimer, the term of this patent is extended or adjusted under 35 U.S.C. 154(b) by 0 days.

(21) Appl. No.: 18/001,677

(22) PCT Filed: Jun. 15, 2021

(86) PCT No.: PCT/FR2021/051076
§ 371 (c)(1),
(2) Date: Dec. 13, 2022

(87) PCT Pub. No.: WO2021/255384
PCT Pub. Date: Dec. 23, 2021

(65) Prior Publication Data
US 2023/0220779 A1 Jul. 13, 2023

(30) Foreign Application Priority Data
Jun. 17, 2020 (FR) .................................... 2006310

(51) Int. Cl.
*F01D 9/02* (2006.01)
(52) U.S. Cl.
CPC ........ *F01D 9/026* (2013.01); *F05D 2220/329* (2013.01); *F05D 2240/14* (2013.01)

(58) Field of Classification Search
CPC ............... F02C 7/08; F02C 7/10; F02C 7/105
See application file for complete search history.

(56) References Cited

U.S. PATENT DOCUMENTS 2,925,830 A * 2/1960 Kautrowitz ............. F16K 47/10
   89/14.3
2,946,192 A * 7/1960 Hambling ................. F02C 7/08
   60/39.511

(Continued)

FOREIGN PATENT DOCUMENTS

| EP | 2 799 666 A2 | 11/2014 |
| FR | 1003131 A | 3/1952 |
| GB | 2 250 780 A | 6/1992 |

OTHER PUBLICATIONS

International Search Report dated Sep. 13, 2021, issued in corresponding International Application No. PCT/FR2021/051076, filed Jun. 15, 2021, 5 pages.

(Continued)

*Primary Examiner* — David P. Olynick
(74) *Attorney, Agent, or Firm* — Christensen O'Connor Johnson Kindness PLLC

(57) ABSTRACT

An aircraft turbomachine having a centrifugal compressor, an annular combustion chamber, an annular casing extending around the chamber and delimiting an annular space (E) in which the chamber is situated, and a heat exchanger. The heat exchanger can include a first circuit supplied with exhaust gas from the turbomachine, and a second circuit connected by first and second volutes respectively to an outlet of the compressor and to the annular space. The first and second volutes can be positioned at an axial distance from one another, and the second volute can be connected to the annular space by a straightener which is situated at least (Continued)

in part outside the casing and which is integrated into an annular connecting pipe which connects the second volute to this casing.

10 Claims, 2 Drawing Sheets

(56)  References Cited

U.S. PATENT DOCUMENTS

| | | | | |
|---|---|---|---|---|
| 5,156,534 A * | 10/1992 | Burgy | ...................... | F04D 13/14 |
| | | | | 415/60 |
| 11,098,730 B2 * | 8/2021 | Mazur | ...................... | F04D 17/10 |
| 2014/0318151 A1 * | 10/2014 | Honnorat | ................ | F01D 9/026 |
| | | | | 415/204 |
| 2017/0159565 A1 * | 6/2017 | Evulet | ........................ | F23R 3/52 |

OTHER PUBLICATIONS

Written Opinion dated Sep. 13, 2021, issued in corresponding International Application No. PCT/FR2021/051076, filed Jun. 15, 2021, 5 pages.

* cited by examiner

US 11,988,112 B2

RECOVERED-CYCLE AIRCRAFT TURBOMACHINE

TECHNICAL FIELD OF THE INVENTION

The present invention relates to an aircraft turbomachine equipped with volutes for the implementation of a recovered cycle.

TECHNICAL BACKGROUND

An aircraft turbomachine comprises a gas generator comprising, from upstream to downstream, in the direction of gas flow, at least one compressor, an annular combustion chamber, and at least one turbine. The compressor is supplied with air and compresses it. The compressed air is mixed with fuel and burned in the combustion chamber, which supplies combustion gases to the turbine. These combustion gases expand in the turbine and rotate its rotor, which in turn drives the compressor rotor via a common shaft.

A turbomachine can be equipped with one or more spools, each of which has a compressor rotor connected by a shaft to a turbine rotor.

There are also turbomachines where a free turbine is mounted downstream of the spool or spools of the turbomachine. A turbine is free if its rotor is not connected by a shaft to a compressor rotor.

It is thus understood that a turbomachine may comprise several successive compressors (e.g. a low-pressure compressor followed by a high-pressure compressor), as well as several successive turbines (e.g. a high-pressure turbine followed by a free turbine or a low-pressure turbine).

In the present application, a conventional cycle turbomachine is defined as a turbomachine in which the compressed air leaving the compressor(s) feeds the combustion chamber directly.

In contrast, a recovered cycle turbomachine is a turbomachine in which the combustion gases flowing out of the turbine(s) are used to heat the compressed air leaving the compressor(s) and intended to feed the combustion chamber. This technology improves the performance of the turbomachine because the amount of fuel required to reach the operating temperature of the turbomachine is less than that required for a conventional cycle turbomachine.

FIG. 1 shows a very schematic representation of a recovered cycle turbomachine.

The turbomachine 1 comprises, from upstream to downstream, a compressor 2, an annular combustion chamber 3, a turbine 4 and a free turbine 5. The rotors of the compressor 3 and the turbine 4 are connected together by a shaft 6 and form a single spool.

The turbomachine 1 comprises a heat exchanger 7, a first circuit of which is supplied with combustion gases taken from the outlet of the free turbine 5. The exchanger 7 comprises a second circuit which is supplied with compressed air from the compressor 2 and which supplies heated compressed air to the combustion chamber 3.

The integration of this technology can be complicated when the compressor 2 is of the centrifugal type. A centrifugal compressor is a compressor that has an inlet oriented parallel to the longitudinal axis of the turbomachine, and an outlet that is oriented radially with respect to this axis.

This type of compressor is associated with a system for diffusing and rectifying the compressed airflow. This system comprises a diffuser-rectifier assembly and therefore comprises an annular diffuser which is oriented substantially radially and is aligned with the outlet of the centrifugal compressor, and an annular rectifier which is oriented substantially axially to direct the compressed airflow towards the combustion chamber.

An integration solution for this technology has been proposed in the past and consists of using a set of two volutes.

As shown in FIG. 2, a volute 8 is a connecting pipe that is wound spirally around an axis and whose fluid flow section changes. In the context of the present application, a volute comprises an annular connecting pipe wound spirally around the longitudinal axis A of the turbomachine and connected to a first port 9 located at the outer periphery of the connecting pipe and oriented in tangential direction, and a second port 10 located at the inner periphery of the connecting pipe and oriented in radial direction.

The flow section is at its maximum at the first port 9 of each volute and at its minimum at the circumferential end of the connecting pipe opposite the first port 10.

A first volute has its second port 10 connected to the outlet of the diffuser and its first port 9 which feeds the inlet of the second circuit of the exchanger (arrows F1 in continuous lines). The outlet of this second circuit is connected to the first port 9 of the second volute, the second port 10 of which is connected to the inlet of the rectifier (dashed arrows F2).

The proposed solution consists firstly of interlocking the volutes, from their first ports, which are paired, to the smaller circumferential ends of the smaller section of the connecting pipes. The solution is also to move the volutes as close as possible to the centrifugal compressor and the combustion chamber.

However, this solution has many disadvantages.

First of all, although bringing the volutes closer to each other, or even placing them next to each other, is advantageous from the point of view of congestion, it is very disadvantageous in particular from the point of view of energy and performance when the volutes are nested inside each other. Indeed, the more the volutes are nested in each other, the greater the risk of heat exchange between the flow circulating in the connecting pipes of the two volutes. The compressed air that is heated by the exchanger and flows through the second volute is then cooled by the colder compressed air intended to supply this exchanger and which flows through the first volute. Pairing the first ports accentuates this phenomenon since the hottest circumferential end of the first volute is located at the level of the coldest circumferential end of the second volute.

In addition, the proposed solution involves significant modifications to the turbomachine and therefore relatively high costs. For example, a complete redesign of the combustion chamber is required. This is also the case for the rectifier, which must be reconfigured to precisely control the velocity (and in particular the Mach) and the gyration of the airflow feeding the combustion chamber.

The prior art also includes the documents GB-A-2250780, U.S. Pat. No. 2,946,192, EP-A2-2799666 and FR-A-1003131.

The present invention provides a simple, effective and economical solution to at least some of these problems.

SUMMARY OF THE INVENTION

The invention relates to an aircraft turbomachine, comprising:
 a centrifugal compressor extending around an axis A,
 an annular combustion chamber extending around the axis A an annular casing extending around the axis A and the chamber and delimiting an annular space in which the chamber is located, and a heat exchanger, this exchanger comprising:

a first circuit supplied with exhaust gases from the turbomachine, and a second circuit comprising an inlet connected by a first volute to an outlet of the compressor, and an outlet connected by a second volute to said space, characterised in that the volutes are at an axial distance from one another, and in that the second volute is connected to the space by a rectifier which is situated at least partly outside the casing and which is integrated in an annular connecting pipe which connects the second volute to this casing.

The volutes are thus arranged to limit the heat exchange between the fluids circulating in their connecting pipes. In addition, the rectifier is specifically designed to optimise the air supply to the chamber, which is very advantageous compared to the previous technique. The fact that this rectifier is located outside the casing offers a multitude of possibilities in the choice of the parameters of this rectifier, among which are its orientation, its length, its radial dimension, and moreover the positions and dimensions of its blades.

Advantageously, the turbomachine is a turboshaft engine, the turboshaft engine being intended, for example, to drive the rotary wing of a helicopter.

The turbomachine according to the invention may comprise one or more of the following steps or features, considered independently of each other or in combination with each other:

the volutes each have a circular or oval shaped flow section;

the rectifier and the second volute, or even at least part of said casing, are formed in one piece; alternatively, they could be formed by assembling several pieces;

said rectifier comprises blades that are configured so that the airflow supplying said space has a predetermined gyration and Mach;

said rectifier comprises two annular walls which are coaxial and extend parallel to each other, these walls being connected to each other by said blades which each comprise an aerodynamic profile the combustion chamber is of the inverted type and comprises a chamber bottom at its downstream end, the second volute being located downstream of a plane perpendicular to the axis and passing through the chamber bottom;

the rectifier is inclined at an angle α of between 0 and 90° with respect to a plane perpendicular to the axis, this angle being measured in a plane passing through this axis;

the second volute has an inner diameter greater than or equal to the external diameter of said casing;

the first volute has an inner diameter smaller than the outer diameter of the casing;

the first and second volutes comprise bosses with threaded holes and/or attachment flanges, which are formed in one piece with the rest of these volutes; alternatively, they could be formed by assembling several parts; these parts can be formed by additive manufacturing for example.

BRIEF DESCRIPTION OF THE FIGURES

Further features and advantages of the invention will become apparent from the detailed description which follows, for the understanding of which reference is made to the attached drawings in which.

DETAILED DESCRIPTION OF THE INVENTION

Figure 1:
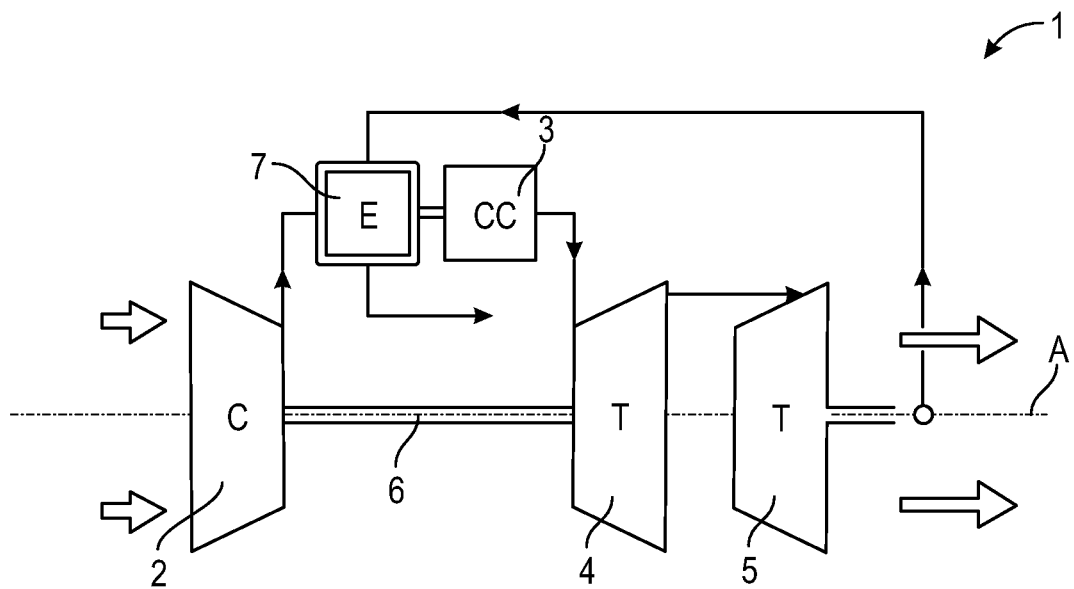
FIG. 1 is a very schematic view of a recovered cycle aircraft turbomachine.
Figure 2:
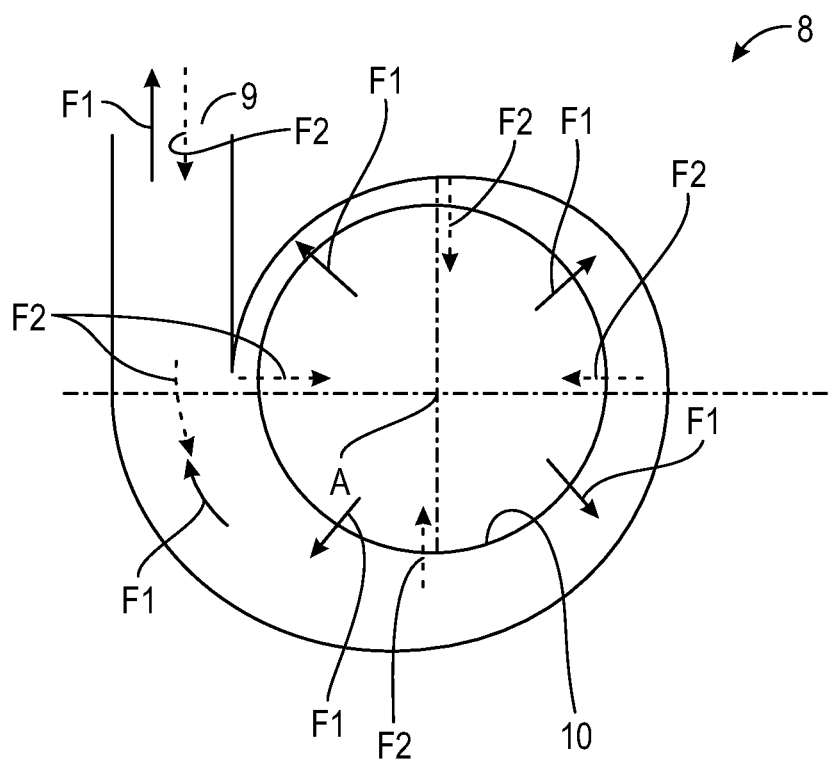
FIG. 2 is a very schematic view of a volute.

FIGS. 1 and 2 have already been described above.

Figure 3:
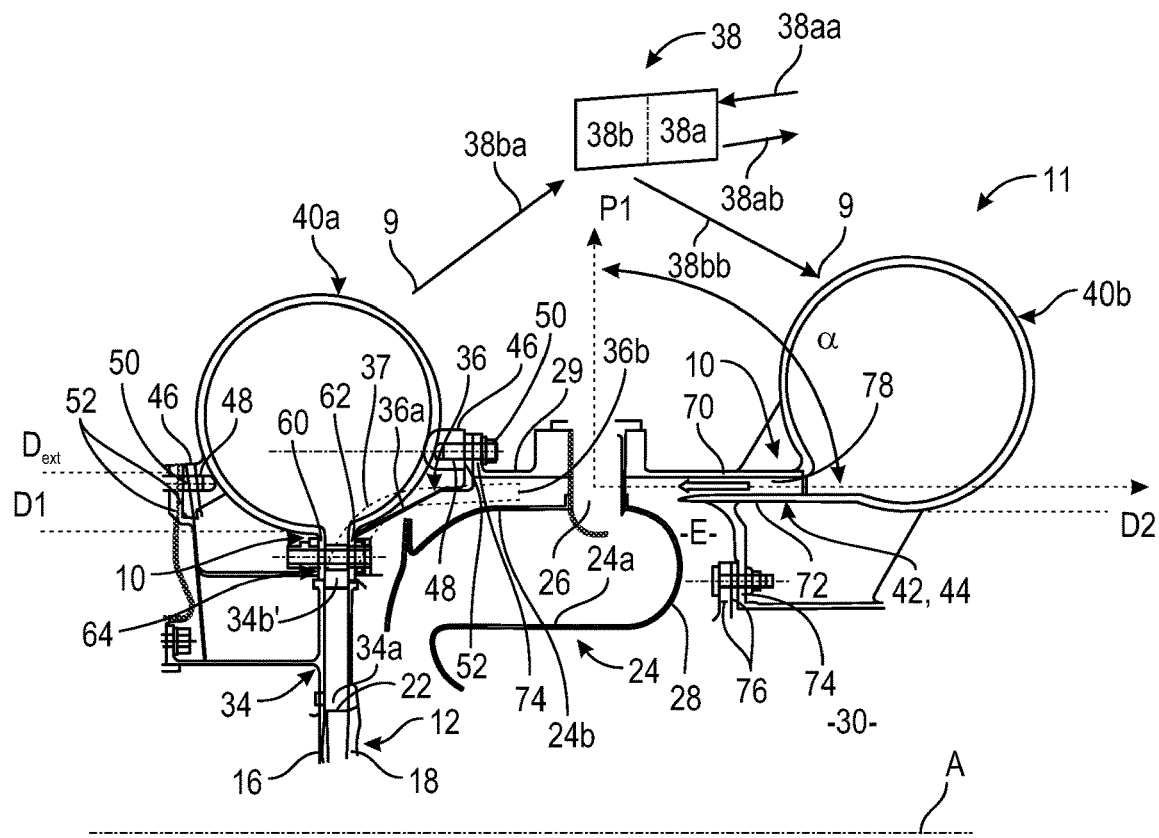
FIG. 3 is a partial schematic view in axial section of a recovered cycle aircraft turbomachine, according to a first embodiment of the invention.
Figure 4:
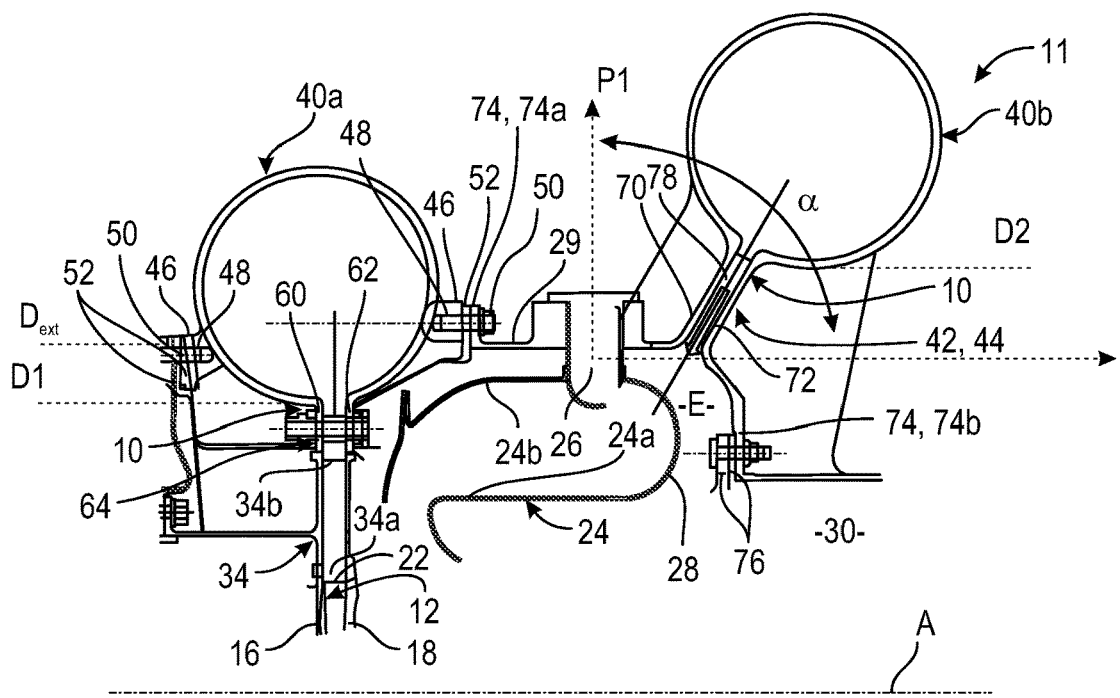
FIG. 4 is a view similar to FIG. 3 and representing a second embodiment of the invention.

FIGS. 3 and 4 illustrate preferred embodiments of an aircraft turbomachine 11.

The turbomachine 11 is partially shown in FIGS. 3 and 4 and conventionally comprises at least one compressor, an annular combustion chamber and at least one turbine.

In the example shown, the turbomachine 11 comprises a compressor 12 of the centrifugal type, which is partially shown.

The compressor 12 has an annular shape about an axis A which is the longitudinal axis of the turbomachine 11. The compressor 12 comprises a stator 16 and a bladed rotor 18, referred to as an impeller, which rotates within the stator 16 and about the axis A.

The compressor 12 has an inlet (not shown) facing axially upstream and an outlet 22 facing radially outwards from the axis A. The terms upstream and downstream here refer to the general flow of air and gases in the turbomachine 11.

The turbomachine 11 further comprises a combustion chamber 24 which is located downstream of the compressor 12.

The combustion chamber 24 comprises two annular walls, respectively inner 24a, and outer 24b, which define between them an annular cavity into which compressed air from the compressor 12 and fuel from injectors 26 are injected and mixed.

The walls 24a, 24b are connected to each other by a chamber bottom 28 which has an annular shape and which comprises orifices (not visible) for the passage of the compressed air from the compressor 12 to feed the chamber 24.

The combustion chamber 24 is surrounded by an external annular casing 29 which carries, in particular, the injectors 26. This casing 29 defines an annular space E in which the chamber 24 is housed.

In the example shown, the chamber 24 is of the inverted type because its chamber bottom 28 is located on the downstream side of this chamber. The outlet of the chamber 24 is located on the upstream side of the chamber and is connected to one or more turbines 30 located downstream of the chamber.

The combustion gases injected into the turbine 30 expand and drive its rotor, which is connected by a shaft to the rotor 18 of the compressor 12 for rotation about the axis A.

The combustion gases are then discharged into a combustion gas exhaust nozzle which is not shown.

In a conventional cycle turbomachine, which comprises many of the same or similar elements as a recovered cycle aircraft turbomachine 11 as shown in FIG. 3, the connection from the outlet of the compressor 12 to the combustion chamber 24 is made by an air diffusion and rectification system, also called a diffuser-rectifier.

This diffuser-rectifier comprises:
- an annular diffuser 34 which is oriented substantially radially and which comprises at its inner periphery an inlet 34a fed by the compressor 12 and aligned radially with the outlet 22 of the latter, and an outlet 34b at its outer periphery which opens radially outwards; and
- an annular rectifier 36 (shown in dotted lines in FIG. 3 to illustrate that this arrangement is present only in a conventional cycle turbomachine) which is oriented substantially axially and which comprises at its upstream end an inlet 36a, and at its downstream end an outlet 36b for supplying the space E and the combustion chamber 24.

The diffuser 34 is located upstream of the chamber 24 and its walls 24a, 24b and the rectifier 36 extends around the chamber 24 and its walls 24a, 24b and inside the casing 29. The diffuser 34 is attached by clamping to the stator 16 of the compressor 12. The rectifier 36 may be clamped to the casing 29.

The diffuser 34 and the rectifier 36 are generally bladed.

In a conventional cycle turbomachine, the outlet 34b of the diffuser 34 is directly connected, for example by a connecting pipe 37 bent in a L-shape (shown in dotted lines in FIG. 3 to illustrate that this arrangement is present only in a conventional cycle turbomachine) to the inlet 36a of the rectifier 36. In other words, the compressed air leaving the compressor 12 feeds the combustion chamber 24 directly.

According to the invention, the turbomachine 11 is of the recovered cycle type which means that the compressed air leaving the compressor 12 is heated before being injected into the combustion chamber 24.

The compressed air is heated by means of a heat exchanger 38 on the one hand and a set of two volutes 40a, 40b on the other.

The heat exchanger 38 is shown schematically and essentially comprises two circuits 38a, 38b, namely:
- a first circuit 38a, an inlet 38aa of which is connected to means for sampling exhaust gases from the outlet of the turbines 30 or from the aforementioned exhaust nozzle, and an outlet 38ab which can also be connected to the exhaust nozzle for the purpose of releasing these gases into the atmosphere, and
- a second circuit 38b having an inlet 38ba and an outlet 38bb connected to the volute assembly 40a, 40b.

The volutes 40a, 40b are aligned on the axis A but separated and thus at an axial distance from each other.

Each volute 40a, 40b comprises a connecting pipe wound spirally around the axis A, as discussed above in relation to FIG. 2.

The volutes 40a, 40b each have a circular or oval-shaped flow section, preferably along their entire circumferential extent. The term "oval" refers to any elliptical, ovoid or oblong shape. However, other shapes are also possible. The flow section of the connecting pipe changes around its circumference, preferably gradually.

Each volute 40a, 40b comprises a first port 9 located at the outer periphery of the connecting pipe and oriented in a tangential direction, and a second port 10 located at the inner periphery of the connecting pipe and oriented in a substantially radial direction. Only the second ports 10 are visible in FIG. 3.

The volute 40a has its second port 10 connected to the outlet 34b of the diffuser 34 and its first port 9 feeding the inlet 38ba of the second circuit 38b of the exchanger 38. The outlet 38bb of this second circuit 38b is connected to the first port 9 of the second volute 40b, the second port 10 of which is connected by a new design of the rectifier 42 to the annular space E in which the chamber 24 is located.

The ports 9 may each be generally tubular in shape and are coupled to the inlet 38ba and outlet 38bb of the exchanger 38 respectively by suitable means.

In the example shown, the volute 40a is located upstream of volute 40b. The distance between the volutes 40a, 40b eliminates any risk of heat exchange between the airflow circulating simultaneously in the two volutes.

Furthermore, the volutes 40a, 40b extend around and away from the casing 29 and are clamped to the latter, as will be detailed below.

The connecting pipe of each volute 40a, 40b comprises an annular skin which defines the aforementioned flow section, and which has a substantially constant thickness, both over its circumferential extent around axis A and also over its entire axial extent when considering an axial cross-section of the connecting pipe, as seen in FIG. 3 for example.

The volute 40a is located substantially in line with the outlet of the compressor 12 and the diffuser 34. The volute 40a has an inner diameter D1 smaller than the external diameter Dext of the casing 29.

The volute 40a comprises several bosses 46 arranged in an annular manner projecting from its skin, which comprise blind and threaded holes 48 for screwing in screws 50.

These bosses 46 are applied against annular flanges 52 of the casing 29 or of another external casing of the turbomachine, these flanges 52 comprising orifices for the screws 50 to pass through.

The second port 44 of the volute 40a comprises two annular walls 60, 62 extending around the axis A and defining between them an air passage duct.

The walls 60, 62 are substantially parallel and project radially towards the inside from the inner periphery of the volute 40a. In the example shown, the walls 60, 62 are radial and extend radially towards the inside.

In the example shown, the volute 40a is formed integrally with these walls 60, 62.

The walls 60, 62 of the volute 40a have free ends opposite the connecting pipe, which define a substantially radially oriented connector 64 for connection to the outlet 34b of the diffuser 34. This connector 64 is annular in shape and may be secured by screws or the like to the casing 29 or another casing of the turbomachine.

In the example shown, the walls 60, 62 have a thickness similar or identical to that of the skin of the volute 40a.

According to the invention, the rectifier 42 and the second port 10 of the volute 40b are integrated into an annular connecting pipe 44 which connects the volute 40b to the casing 29 of the chamber and which extends at least in part projecting outside the casing. The volute 40b is located downstream of the chamber 24.

The connecting pipe 44 comprises two annular walls 70, 72 extending around the axis A and defining between them an air passage duct. The walls 70, 72 are substantially parallel and project from the casing with at least one axial component.

In the embodiment shown in FIG. 3, the connecting pipe 44 extends substantially axially. In the embodiment shown in FIG. 4, the connecting pipe 44 is inclined at an angle α of between 0 and 90° with respect to a plane P1 perpendicular to the axis A, this angle α being measured in a plane passing through this axis. The angle α is preferably strictly greater than 0° and preferably strictly less than 90°.

In the example shown, the walls 70, 72 have a thickness similar or identical to that of the skin of the volute 40b.

The volute 40b is here formed in one piece with a part of the casing 29, this part of the casing comprising annular flanges 74 for attachment to other flanges 76 of the turbomachine.

In the example shown, the volute 40b is connected to an upstream flange 74a for attachment to a flange 52 and to a boss 46 for attachment of the volute 40a. The aforementioned screws 50 pass through orifices in the flanges 45, 74a and are screwed into the blind holes 48 in the boss 46.

The volute 40b is further connected to a downstream flange 74b for attachment to flanges 76 of, for example, an inner casing of the chamber 24.

The volute 40b has an inner diameter D2 greater than the external diameter Dext of the casing 29 in the case of FIG. 4.

The rectifier 42 includes blades 78 which extend between the walls 70, 72 and which are configured so that the airflow supplied to the space E has a predetermined gyration and Mach. In practice, the blades 78 have an aerodynamic profile and are sized according to the flow rate and velocity of the air leaving the exchanger 38 to give the air leaving the rectifier 42 a Mach (or velocity) and gyration (velocity profile about the axis A) which are specifically adapted to the chamber 24 and in particular to its type, shape and dimensions. This limits pressure drops in the space E and optimises the air supply to the chamber 24 and thus the performance of the turbomachine. The blades 78 may have a longitudinal dimension, along an axis of elongation of the connecting pipe 44, which is at least 80% of the length of this connecting pipe.

The invention claimed is:

1. An aircraft turbomachine, comprising:
a centrifugal compressor extending around an axis A;
an annular combustion chamber extending around the axis A;
an annular casing extending around the axis A and the chamber and delimiting an annular space in which the annular combustion chamber is located; and
a heat exchanger comprising:
a first circuit supplied with exhaust gases from the aircraft turbomachine;
and a second circuit having an inlet connected by a first volute to an outlet of the centrifugal compressor, and an outlet connected by a second volute to the annular space,
wherein the first and second volutes are distinct and axially spaced from one another along the axis A on either side of the annular combustion chamber, and
wherein the second volute is connected to the annular space by a rectifier located at least in part outside the annular casing, the rectifier being integrated into an annular connecting pipe connecting the second volute to the annular casing.

2. The aircraft turbomachine of claim 1, wherein the first and second volutes each have a circular or oval shaped flow section.

3. The aircraft turbomachine of claim 1, wherein the rectifier, the second volute, or at least a portion of the annular casing are formed in one piece.

4. The aircraft turbomachine of claim 1, wherein the rectifier comprises blades that are configured so that the airflow supplying the annular space has a predetermined gyration and Mach.

5. The aircraft turbomachine of claim 4, wherein the rectifier comprises two annular walls which are coaxial and extend parallel to each other, and wherein the two annular walls are connected to each other by the blades which each comprise an aerodynamic profile.

6. The aircraft turbomachine of claim 1, wherein the combustion chamber is of an inverted type and comprises a chamber bottom at its downstream end, the second volute being situated downstream of a plane perpendicular to the axis A and passing through the chamber bottom.

7. The aircraft turbomachine of claim 1, wherein the rectifier is inclined at an angle α of between 0° and 90° with respect to a plane perpendicular to the axis A, the angle α being measured in a plane passing through the axis A.

8. The aircraft turbomachine of claim 1, wherein the second volute has an inner diameter greater than or equal to an external diameter of the annular casing.

9. The aircraft turbomachine of claim 1, wherein the first volute has an inner diameter smaller than an outer diameter of the annular casing.

10. The aircraft of claim 1, wherein the first and second volutes comprise one or more of: (a) bosses with threaded holes; or (b) attachment flanges, and wherein the bosses and/or attachment flanges are formed in one piece with the remainder of the first and second volutes.

* * * * *